US008686966B2

(12) United States Patent
Homma et al.

(10) Patent No.: US 8,686,966 B2
(45) Date of Patent: Apr. 1, 2014

(54) INFORMATION PROCESSING APPARATUS, INFORMATION PROCESSING METHOD AND PROGRAM

(75) Inventors: Fuminori Homma, Tokyo (JP); Tatsushi Nashida, Kanagawa (JP)

(73) Assignee: Sony Corporation, Tokyo (JP)

(*) Notice: Subject to any disclaimer, the term of this patent is extended or adjusted under 35 U.S.C. 154(b) by 304 days.

(21) Appl. No.: 12/858,161

(22) Filed: Aug. 17, 2010

(65) Prior Publication Data

US 2011/0050629 A1 Mar. 3, 2011

(30) Foreign Application Priority Data

Sep. 2, 2009 (JP) ................. P2009-202956

(51) Int. Cl.
*G06F 3/045* (2006.01)
*G06F 3/041* (2006.01)

(52) U.S. Cl.
USPC .......................................... 345/174; 345/173

(58) Field of Classification Search
USPC .......... 345/156, 157, 173–176; 715/701–702, 715/863, 862; 178/18.04–18.09
See application file for complete search history.

(56) References Cited

U.S. PATENT DOCUMENTS

| 7,408,538 | B2* | 8/2008 | Hinckley et al. | 345/173 |
| 7,469,381 | B2* | 12/2008 | Ording | 715/702 |
| 7,653,883 | B2* | 1/2010 | Hotelling et al. | 715/863 |
| 2005/0179657 | A1* | 8/2005 | Russo et al. | 345/163 |
| 2006/0187214 | A1* | 8/2006 | Gillespie et al. | 345/173 |
| 2007/0229477 | A1* | 10/2007 | Ludwig | 345/173 |
| 2008/0122798 | A1 | 5/2008 | Koshiyama et al. | |
| 2010/0107099 | A1* | 4/2010 | Frazier et al. | 715/765 |
| 2012/0068760 | A1* | 3/2012 | Caldwell et al. | 327/517 |

FOREIGN PATENT DOCUMENTS

JP 2008-117371 5/2008

* cited by examiner

*Primary Examiner* — Kent Chang
*Assistant Examiner* — Nelson Rosario
(74) *Attorney, Agent, or Firm* — Sherr & Jiang, PLLC

(57) ABSTRACT

There is provided an information processing apparatus including a pressure value detection section that detects a pressure value which is a size of a pressure applied to the contact surface by the operation tool, a pressure value monitor section that monitors the pressure value detected by the pressure value detection section in conjunction with an elapsed time, a proximity volume determination section that determines whether the proximity volume detected by the touch panel meets a first condition to be larger than a first threshold, a pressure value determination section that determines whether the pressure value monitored by the pressure value monitor section has changed, and a process control section that does not allow the first processing section to execute the first processing when the proximity volume determination section determines the first condition is met and the pressure value determination section determines the pressure value is not changed.

20 Claims, 13 Drawing Sheets

FIG.5
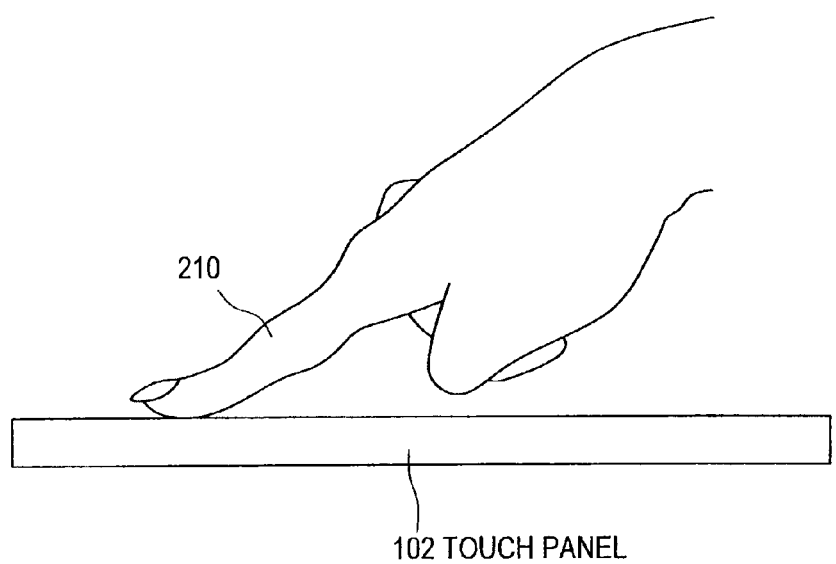
102 TOUCH PANEL
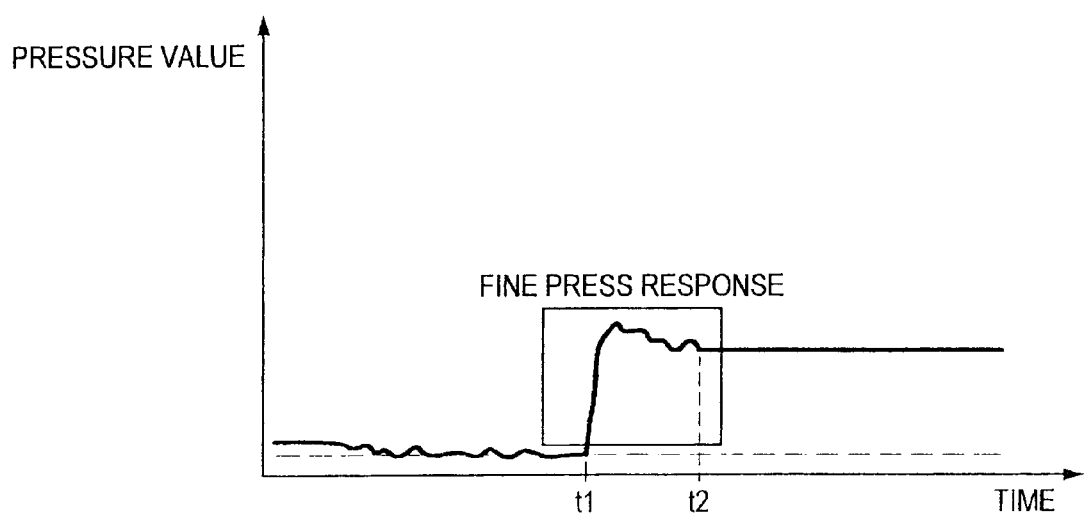

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing method and program.

2. Description of the Related Art

In recent years, a user interface using a capacitive touch panel has become widespread. When an operation tool such as a user's finger comes into proximity to or contacts with a capacitive touch panel, capacitance on the touch panel increases, and a device having the touch panel determines that the operation tool touches (hereinafter, referred to as "a touch determination") when an increased volume of the capacitance exceeds a predetermined threshold. Moreover, when it is determined that the operation tool has touched, an application running on the device can perform an arbitrary processing.

Thus, a device having a capacitive touch panel is capable of detecting not only an operation tool that touches the touch panel but also an operation tool that locates away from the touch panel (for example, refer to JA 2008-117371A). This enables a user operates an object on a screen corresponding to the touch panel by bringing the operation tool close to a position adjacent to the touch panel (for example, a position three centimeters away from the touch panel) (hereinafter referred to as "a proximity operation"), without an operation in which the operation tool contacts the touch panel (hereinafter referred to as "a contact operation"). Moreover, it is possible to dynamically change a parameter used for a processing executed by the application in accordance with a distance between the touch panel and the operation tool. As the parameter, for example, there may be a zoom rate of information displayed on a screen.

SUMMARY OF THE INVENTION

However, since the device having a capacitive touch panel generally performs a touch determination when a change in capacitance on the touch panel exceeds a predetermined threshold, it does not determine whether an operation tool touched the touch panel or not. Since a degree of change in the capacitance differs between individuals and environments, and a certain amount of time is needed to change the capacitance, if the operation tool contacts or comes into proximity to the touch panel instantly, enough amount of change in the capacitance cannot be obtained. Therefore, if the threshold is set too high, the device may not be able to do the touch determination although the user thinks he/she has touched. For example, there may be a case where the operation tool instantaneously contacts with or comes into proximity to the touch panel. On the other hand, if the threshold is set too low, accuracy in the touch determination will be high, however, the device would determine that there was a touch although the user does not think he/she has not touched.

Such a phenomenon is most obvious on a boundary between a contact operation and a proximity operation. That is, there has been a problem that if a proximity operation is performed extremely close to the touch pane, it may be recognized wrongly as a contact operation by the device due to individual differences or environmental effects. Because of that reason, the threshold for determining that there was a contact operation and the threshold for determining that there was a proximity operation should be set with an enough difference so that the contact operation and the proximity operation are not wrongly recognized. Having a big difference between the thresholds, when a user needs to perform the proximity operation from a place away from the touch panel, there would be inconvenient for the user, and the user may not be able to perform the proximity operation as a noise influence becomes greater. Due to this, it would be difficult to assign a different processing to each of the contact operation and the proximity operation.

In light of the foregoing, it is desirable to provide a novel and improved technology capable of clearly distinguish between a contact operation and a proximity operation to a touch panel by an operation tool.

According to an embodiment of the present invention, there is provided an information processing apparatus which includes a display section that has a display surface and is capable of displaying information on the display surface, a touch panel that has a contact surface and is capable of detecting a degree of proximity between the contact surface and an operation tool as a proximity volume, a pressure value detection section that detects a pressure value which is a size of a pressure applied to the contact surface by the operation tool, a pressure value monitor section that monitors the pressure value detected by the pressure value detection section in conjunction with an elapsed time, a proximity volume determination section that determines whether the proximity volume detected by the touch panel meets a first condition which is to be larger than a first threshold, a pressure value determination section that determines whether the pressure value monitored by the pressure value monitor section has changed, a first processing section capable of executing a first processing, and a process control section that allows the first processing section to execute the first processing when the first condition is determined to be met by the proximity volume determination section and the pressure value is determined to be changed by the pressure value determination section, and that does not allow the first processing section to execute the first processing when the first condition is determined to be met by the proximity volume determination section and the pressure value is determined not to be changed by the pressure value determination section.

The touch panel may detect capacitance on the contact surface as the proximity volume, the capacitance which is increased as the operation tool comes into proximity with the contact surface.

The information processing apparatus may further include a second processing section capable of executing a second processing. The process control section may allow the second processing section to execute the second processing when the first condition is determined to be met by the proximity volume determination section and the pressure value is determined not to be changed by the pressure value determination section.

The information processing apparatus may further include a drag detection section that detects a drag that is an operation in which the operation tool moves while contacting the contact surface, as well as a distance and a direction that the operation tool moves while contacting the contact surface by the drag. The first processing section may execute a processing based on the distance and the direction which are detected by the drag detection section as the first processing.

The second processing section may detect a distance and a direction that the operation tool moves while coming into proximity with the contact surface, and may execute a processing based on the distance and the direction that are detected as the second processing.

The first processing section may execute a processing of scrolling one page displayed in the display surface based on the distance and the direction which are detected by the drag detection section as the first processing.

The second processing section may execute a processing of scrolling between a plurality of pages displayed in the display surface based on the distance and the direction that are detected as the second processing.

The second processing section may execute a processing of enlarging and reducing information displayed in the display surface based on the distance and the direction that are detected as the second processing.

The second processing section may execute a processing of speeding up and down a reproducing speed of a video image displayed in the display surface based on the distance and the direction that are detected as the second processing.

The proximity volume determination section may determine whether the proximity volume detected by the touch panel meets a second condition that is to be larger than a second threshold which is smaller than the first threshold before determining whether the first condition is met. When the second condition is met by the proximity volume determination section, the process control section may determine whether the first condition is met, and when the first condition is determined not to be met by the proximity volume determination section, the process control section may allow the second processing section to execute the second processing at a speed different from a case where the first condition is determined to be met by the proximity volume determination section and the pressure value is determined not to be changed by the pressure value determination section.

According to the present invention described above, it can be possible to clearly distinguish between a contact operation and a proximity operation to a touch panel by an operation tool.

BRIEF DESCRIPTION OF THE DRAWINGS

FIG. 5 is an explanatory view illustrating a pressure value change detected by the information processing apparatus according to the first embodiment;

DETAILED DESCRIPTION OF THE EMBODIMENT(S)

Figure 1:
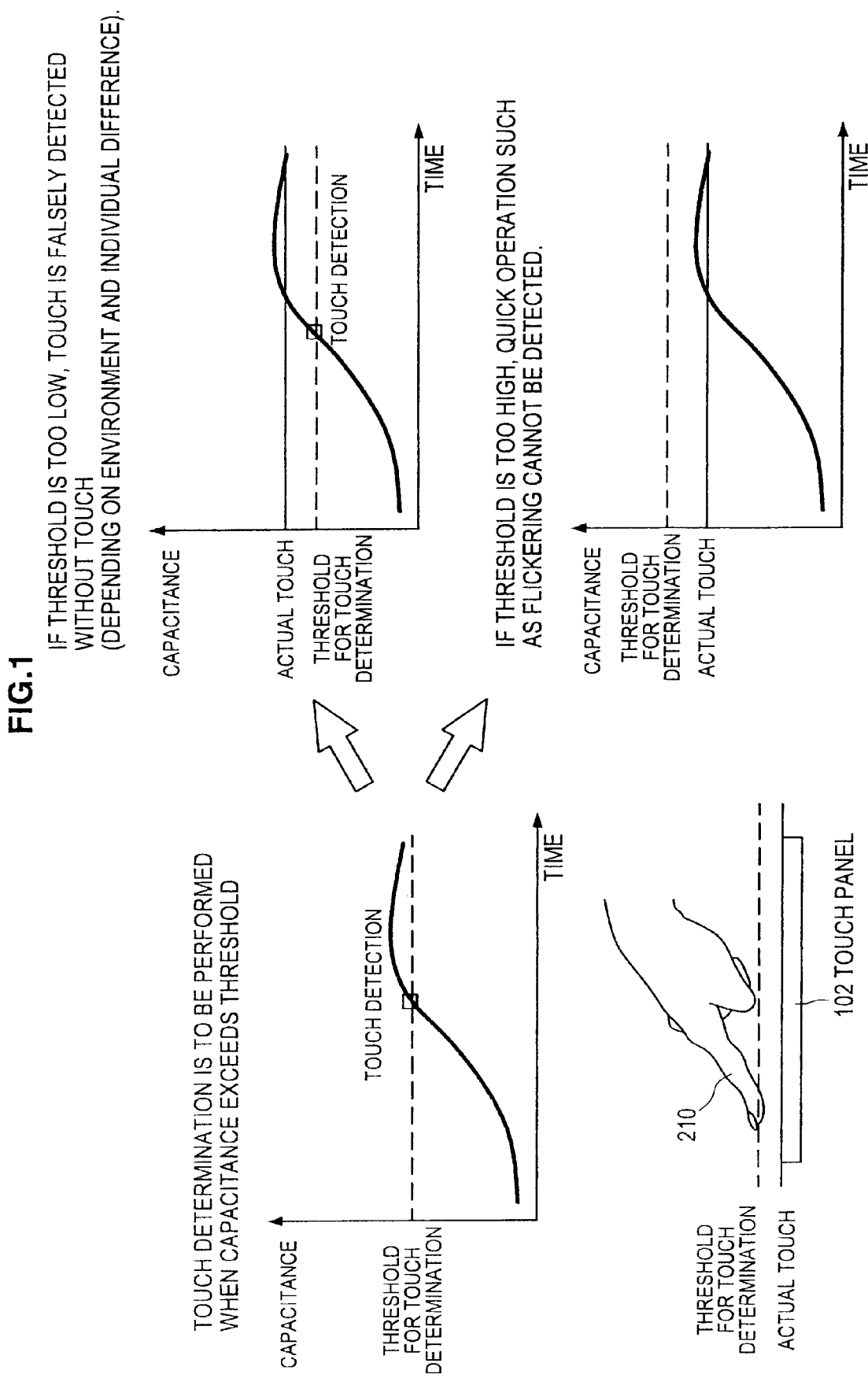
FIG. 1 is an explanatory view illustrating a touch determination by an ordinary information processing apparatus.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given in the following order.
1. A First Embodiment of the Present Invention
 1-1. A touch determination by an ordinary information processing apparatus
 1-2. A view on how an information processing apparatus is operated
 1-3. An exploded perspective view of an information processing apparatus
 1-4. A hardware configuration of an information processing apparatus
 1-5. A pressure value change detected by an information processing apparatus
 1-6. An overview of functions of an information processing apparatus
 1-7. A functional configuration of an information processing apparatus
 1-8. A correspondence between capacitance or a pressure value which are detected by an information processing apparatus and a processing to be executed
 1-9. A flow of operation in an information processing apparatus (1)
 1-10. A flow of operation in an information processing apparatus (2)
 1-11. An operation when a pressure value is detected by an information processing apparatus
 1-12. An operation when a relatively large capacitance is detected by an information processing apparatus
 1-13. An operation when a relatively small capacitance is detected by an information processing apparatus
2. Modification of the First Embodiment of the Present Invention
3. Summary
1. A First Embodiment of the Present Invention
1-1. A Touch Determination by an Ordinary Information Processing Apparatus FIG. 1 is an explanatory view illustrating a touch determination by an ordinary information processing apparatus. A touch determination by the ordinary information processing apparatus will be explained with reference to FIG. 1.

As shown in FIG. 1, the information processing apparatus controls thresholds for a touch determination (a determination that an operation tool 210 touched), and generally the touch determination is performed when capacitance of a touch panel 102, which is a capacitive touch panel, exceeds the threshold. Here, if the threshold for a touch determination is too high, the information processing apparatus may not be able to determine that there was a touch although the user thinks he/she touched. For example, a quick operation such as a flick and an instant touch are operations highly possible not to be determined as a touch.

On the other hand, if the threshold for the touch determination is too low, the accuracy in the touch determination will be high, however, the information processing apparatus would determine that there was a touch although the user does not think he/she did not touch.

However, as described above, there is a possibility that if a proximity operation is performed extremely close to the touch panel, it may be recognized wrongly as a contact operation by the device due to individual differences or environmental effects. The first embodiment of the present invention is mainly intended to clearly distinguish between a contact operation and a proximity operation to the touch panel 102 by the operation tool 210.

1-2. How an Information Processing Apparatus is Operated

Figure 2:
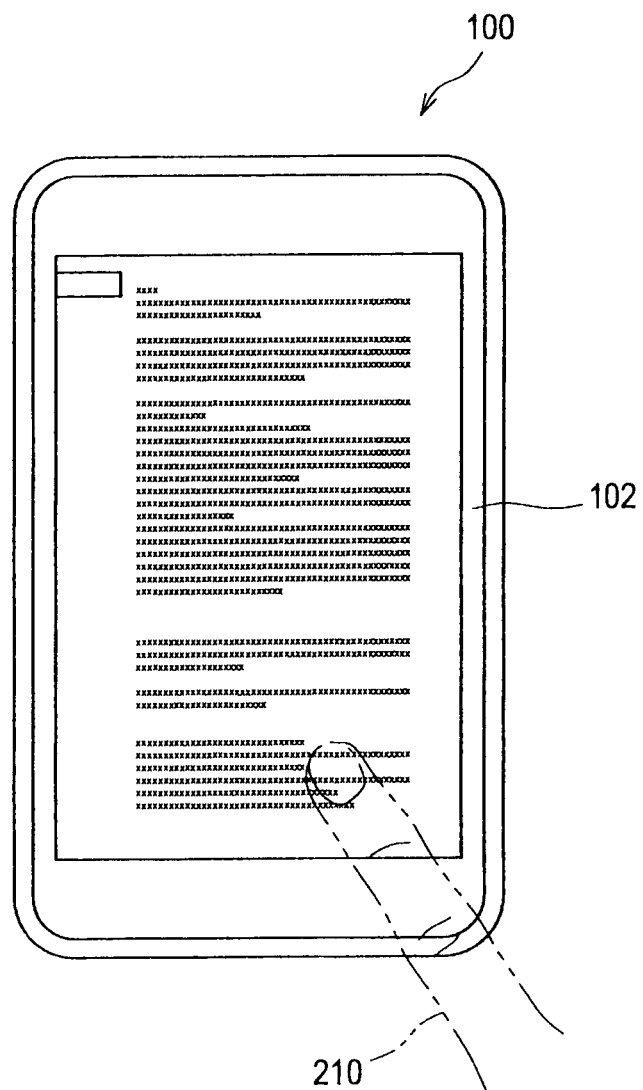
FIG. 2 is an explanatory view illustrating how an information processing apparatus according to a first embodiment of the present invention is operated.

FIG. 2 is an explanatory view illustrating how an information processing apparatus according to a first embodiment of the present invention is operated. An explanation on how the information processing apparatus according to the first embodiment of the present invention is operated will be given with reference to FIG. 2.

An information processing apparatus 100 according to the first embodiment of the present invention includes a touch panel 102. A user can perform a proximity operation by bringing the operation tool 210 close to the touch panel 102. Moreover, the user can perform the contact operation by touching the touch panel 102 with the operation tool 210. In the following explanation, it is assumed that a right index finger of the user is used as the operation tool 210, however, the user does not need to limit the particular finger, but may use any other finger easy to use. For example, the user may use any left finger, other than index finger, such as thumb, middle finger, ring finger or pinky finger.

1-3. An Exploded Perspective View of the Information Processing Apparatus

Figure 3:
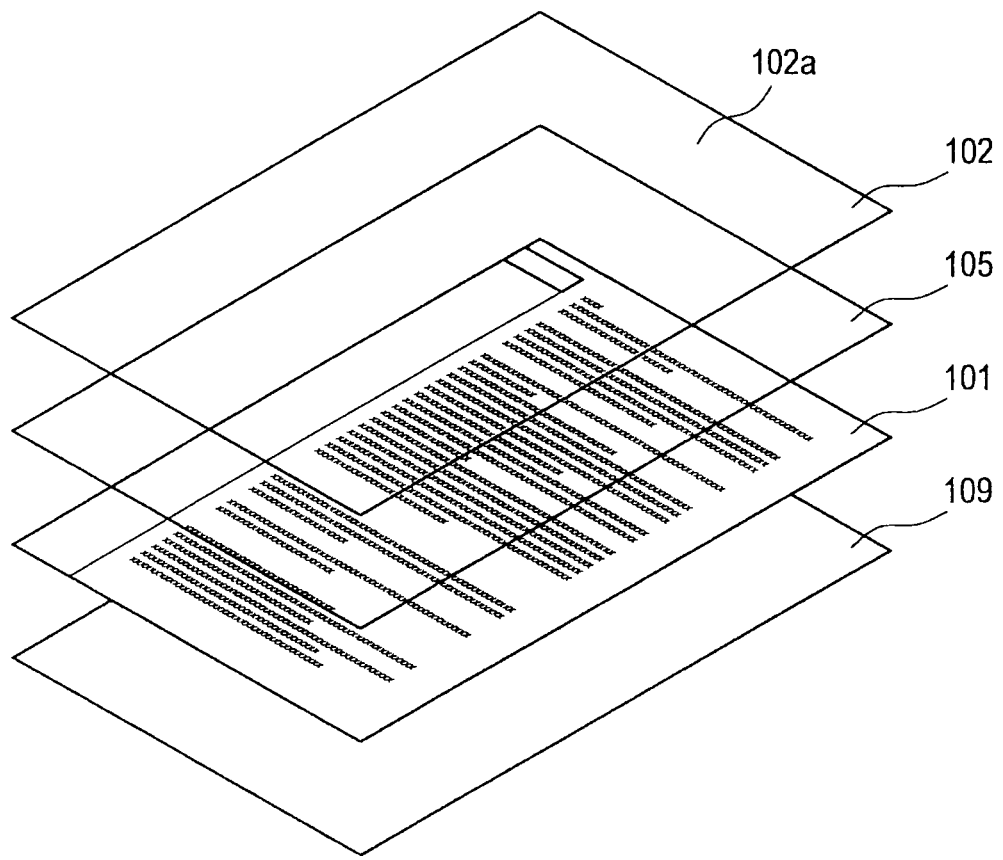
FIG. 3 is an exploded perspective view illustrating the information processing apparatus according to the first embodiment.

FIG. 3 is an exploded perspective view illustrating the information processing apparatus according to the first embodiment. An explanation will be given on a hardware configuration of the information processing apparatus according to the first embodiment of the present invention with reference to FIG. 3. In FIG. 3, an example is illustrating that the touch panel 102, a pressure sensor (a pressure sensitive sensor) 105, a display device 101 and a substrate 109 are built up in the order described from the upper surface to the bottom surface of the information processing apparatus 100. However, the order of building up is not necessarily limited to this example.

As shown in FIG. 3, the touch panel 102 is arranged on the upper surface of the information processing apparatus 100. Having a contact surface 102a which the operation tool 210 of the user can contact with or come into proximity to, the touch panel 102 can obtain a position information indicating a position in contact with or in proximity to the operation tool 210 on the contact surface 102a. The touch panel 102 outputs the obtained position information to a CPU 108 (refer to FIG. 4) as an information signal. The user of the information processing apparatus 100 can input various data or instruct processing operations to the information processing apparatus 100 by bringing the operation tool 210 in contact with or in proximity to the touch panel 102. As for the touch panel 102, a capacitive touch panel that detects a position by capturing a change in capacitance between the finger and a conducting layer will be explained as an example. However, any sort of panel can be used if it can detects the position and the degree of proximity on the contact surface 102a which the operation tool 210 contacts with or comes into in proximity to. For example, an infrared ray distance device that detects proximity of a finger by a reflection of infrared ray, or a wireless device that is configured from a wireless tag and a receiving circuit.

On the bottom surface of the touch panel 102, the pressure sensor 105 is arranged. The pressure sensor 105 may be arranged, as shown in FIG. 3, over the entire surface of the bottom surface of the touch panel 102, or may be arranged on a predetermined places (such as four corners, etc.), however, the position where the pressure sensor 105 is arranged is not specifically limited. The pressure sensor 105 may be arranged on a position where pressure received by the contact surface 102a from the operation tool 210 can be detected when the user presses the touch panel 102 using the operation tool 210.

The display device 101 is placed on the bottom surface of the pressure sensor 105. The display device 101 is enabled to display information. The display device 101 is configured from, for example, an apparatus capable of visually notifying the user of information such as an LCD (Liquid Crystal Display) and organic EL (Electroluminescence) display device. The display device 101 outputs, for example, results obtained by various kinds of processing performed by the information processing apparatus 100. More specifically, the display device 101 displays the results obtained by various kinds of processing performed by the information processing apparatus 100 in the form of text or image. Moreover, in the present embodiment, the display device 101 is to be arranged on the bottom surface of the pressure sensor 105, however, the position to be arranged is not specifically limited. For example, the display device 101 may exist outside of the information processing apparatus 100.

The substrate 109 is arranged on the bottom surface of the display device 101. Various components or devices used by the information processing apparatus 100 are mounted on the substrate 109. More specifically, devices such as a non-volatile memory 106, a RAM (Random Access Memory) 107, the CPU (Central Processing Unit) 108 and the like later-described using FIG. 4 later are mounted.

1-4. Hardware Configuration of Information Processing Apparatus

Figure 4:
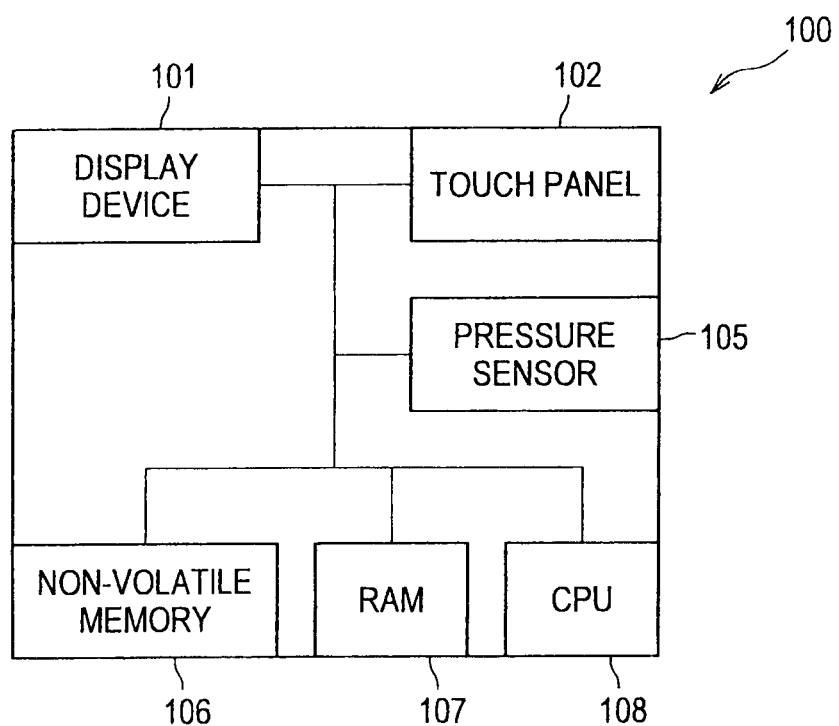
FIG. 4 is an explanatory view illustrating a hardware configuration of the information processing apparatus according to the first embodiment.

FIG. 4 is an explanatory view illustrating a hardware configuration of the information processing apparatus according to the first embodiment of the present invention. The hardware configuration of the information processing apparatus according to the first embodiment of the present invention will be explained with reference to FIG. 4.

As shown in FIG. 4, the information processing apparatus 100 is configured from the display device 101, the touch panel 102, the pressure sensor 105, the non-volatile memory 106, the RAM 107 and the CPU 108. However, as described above, the display device 101 may exists outside of the information processing apparatus 100. Here, the non-volatile memory 106, the RAM 107 and the CPU 108 will be explained.

The non-volatile memory 106 is a data storage apparatus and is configured from, for example, a magnetic storage device such as an HDD (Hard Disk Drive), semiconductor storage device, optical storage device, or magneto-optical storage device. The non-volatile memory 106 stores programs executed by the CPU 108 and various kinds of data.

The RAM 107 temporarily stores programs used by the CPU 108 and parameters that appropriately change during execution thereof.

The CPU 108 functions as an arithmetic processing unit and a control apparatus and controls the overall operation inside the information processing apparatus 100 or a portion thereof according to various programs recorded in the non-volatile memory 106 or the RAM 107.

In the foregoing, an example of the hardware configuration that can realize the function of the information processing apparatus 100 according to the embodiment of the present invention has been shown. Each of the above components may be configured using general-purpose members or hardware specialized for the function of each component. Therefore, the hardware configuration to be used can be changed appropriately in accordance with the technical level each time when the present embodiment is carried out.

1-5. A Pressure Value Change Detected by an Information Processing Apparatus

FIG. 5 is an explanatory view illustrating a pressure value change detected by the information processing apparatus according to the first embodiment of the present invention. The pressure value change detected by the information processing apparatus according to the first embodiment of the present invention will be explained with reference to FIG. 5.

The pressure sensor 105 detects the size of the pressure applied to the pressure sensor 105 as a pressure value. When the user presses the touch panel 102 using the operation tool 210, the pressure sensor 105 detects the size of the pressure applied to the pressure sensor 105 by the touch panel 102 being pressed as the pressure value. From an example shown in FIG. 5, it can be understood that there was a fine press response (time: t1 to t2) on the pressure sensor 105 by the touch panel 102 being pressed.

If the operation tool 210 contacts the pressure sensor 105 directly or indirectly through the touch panel 102 or the like, although the contact is extremely weak, the pressure sensor 105 certainly shows a fine press response. On the contrary, unless any contact occurs to the pressure sensor 105 directly or indirectly through the touch panel 102 or the like, the pressure sensor 105 rarely respond to the noise or environment.

1-6. An Overview of Functions of an Information Processing Apparatus

Figure 6:
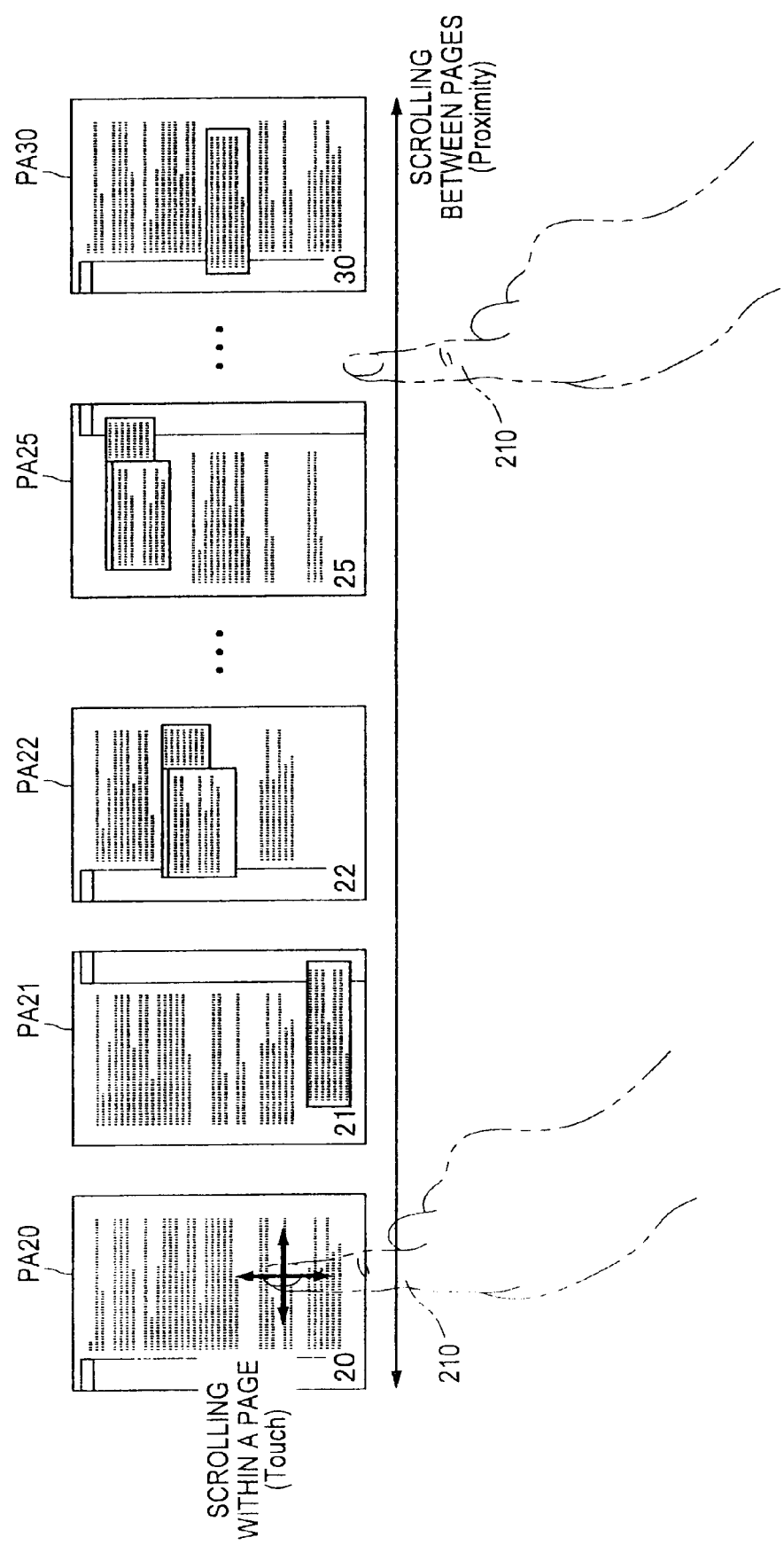
FIG. 6 is an explanatory view illustrating the overview of functions of the information processing apparatus according to the first embodiment.

FIG. 6 is an explanatory view illustrating the overview of functions of the information processing apparatus according to the first embodiment of the present invention. The overview of functions of the information processing apparatus according to the first embodiment of the present invention will be explained with reference to FIG. 6.

As shown in FIG. 6, in the present embodiment, for example, when documents to be displayed on the display device 101 or the like are configured from a plurality of pages, scrolling within a page and scrolling between pages can be realized through different operations by the operating tool 210. For example, the contact operation by the operation tool 210 enables the scrolling within a page, and the proximity operation by the operation tool 210 enables the scrolling between pages. The scrolling within a page is illustrated as a scrolling on page PA20, in FIG. 6. The scrolling between pages is illustrated as a scrolling between page PA20 to PA30, in FIG. 6. As explained with reference to FIG. 5, the pressure sensor 105 does not show the press response when the user performs the proximity operation, but shows the press response when the user performs the contact operation. Using this phenomenon, the information processing apparatus 100, for example, scrolls within a page when the pressure sensor 105 shows the press response, and scrolls between pages when the touch panel 102 detects the operation tool 210 and the pressure sensor 105 does not show a press response.

1-7. A Functional Configuration of an Information Processing Apparatus

Figure 7:
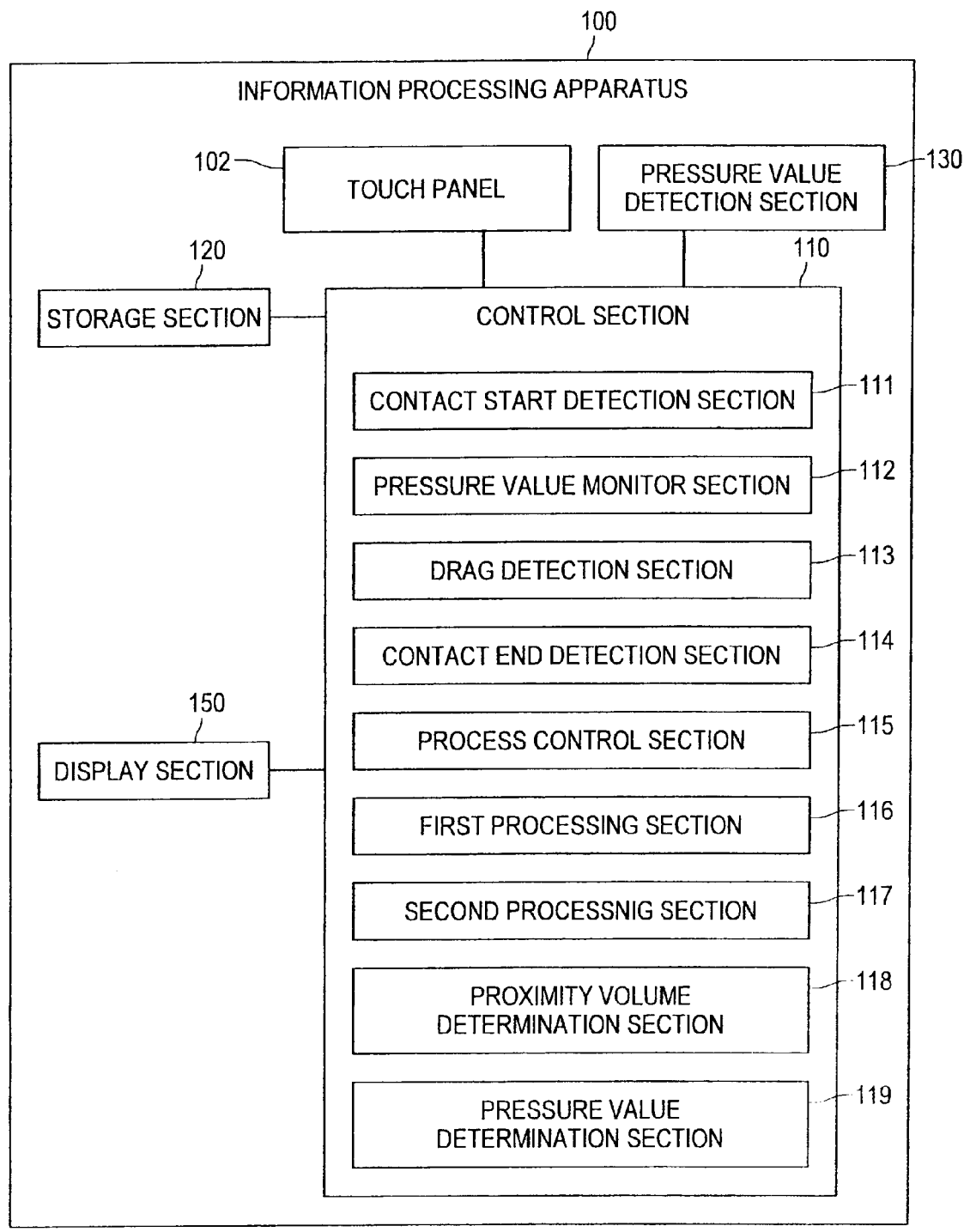
FIG. 7 is an explanatory view illustrating a functional configuration of the information processing apparatus according to the first embodiment.

FIG. 7 is an explanatory view illustrating a functional configuration of the information processing apparatus according to the first embodiment of the present invention. The functional configuration of the information processing apparatus according to the first embodiment of the present invention will be explained with reference to FIG. 7.

As shown in FIG. 7, the information processing apparatus 100 includes a control section 110, a storage section 120, a pressure value detection section 130, the touch panel 102 and a display section 150.

The storage section 120 is configured of, for example, the non-volatile memory 106 or the like, and includes functions to store data or the like used when a program or the control section 110 executes processing.

The display section 150 is configured of, for example, the display device 101 or the like, includes a display surface, and is able to display information on the display surface. Information to be displayed in the display surface is output from, for example, a first processing section 116 or a second processing section 117. Moreover, as described above, the display section 150 may exists outside of the information processing apparatus 100.

The touch panel 102 is configured of, for example, a capacitive touch panel or the like, includes the contact surface 102a and is able to detect the degree of proximity between the contact surface 102a and the operation tool 210 as the proximity volume. As described above, the touch panel 102 is not limited to the capacitive touch panel.

The pressure value detection section 130 is configured of, for example, the pressure sensor 105 or the like, and detects the pressure value that is a size of pressure applied to the contact surface 102a by the operation tool 210. Note that pressure value detection section 130 can detect, if directly, the pressure value that is a size of pressure applied to the pressure value detection section 130. Therefore, the pressure value detection section 130 detects indirectly the pressure value that is the size of the pressure applied to the contact surface 102a by detecting the pressure value that is the size of pressure applied to the pressure value detection section 130 through the contact surface 102a by the operation tool 210.

The control section 110 is configured from, for example, the CPU 108, the RAM 107 or the like, and includes a pressure value monitor section 112, the proximity volume determination section 118, the first processing section 116, a process control section 115 or the like. Functions included in the control section 110 can be realized, for example, by the CPU 108 which develops a program stored in the storage section 120 into the RAM 107 and executes the program developed into the RAM 107.

The pressure value monitor section 112 monitors the pressure value detected by the pressure value detection section 130 in conjunction with an elapsed time. The pressure value monitor section 112 retains the monitored pressure value correlating to the elapsed time. The reference time for the elapsed time is not to be specifically limited, and may be based on the time right after when the power of the information processing apparatus 100 turned on, or may be the time when the CPU 108 started the program.

The proximity volume determination section 118 determines whether a first condition is met, in which the proximity volume detected by the touch panel 102 is larger than a first threshold. As for the first threshold, for example, threshold A (refer to FIG. 8) can be used. Note that a case where the proximity volume is larger than the first threshold means a case where the operation tool 210 locates closer to the contact surface 102a than the position where the proximity volume equals to the first threshold. The first threshold is stored by, for example, the storage section 120.

The pressure value determination section 119 determines whether the pressure value monitored by the pressure value monitor section 112 has been changed. The pressure value determination section 119 determines that the pressure valued has been changed when the fine press response described above is detected from the pressure sensor 105, for example. Therefore, the pressure value determination section 119 retains a threshold regarding the pressure value, and determines that the pressure value has been changed when the pressure value monitored by the pressure value monitor section 112 exceeds that threshold. The threshold is stored by, for example, the storage section 120.

The first processing section 116 is capable of executing the first processing. The first processing is not to be specifically limited, but in the above example, corresponds to the scrolling within a page.

The process control section 115 allows the first processing section 116 to execute the first processing when the proximity volume determination section 118 determines that the first condition is met and the pressure value determination section 119 determines that the pressure value has been changed. The process control section 115 does not allow the first processing section 116 to execute the first processing when the proximity volume determination section 118 determines that the first condition is met and the pressure value determination section 119 determines that the pressure value has not been changed.

The touch panel 102 detects capacitance on the contact surface 102a as the proximity volume, the capacitance which is increased as the operation tool 210 comes into proximity with the contact surface 102a. That is, as an example of the touch panel 102, a capacitive touch panel can be used.

The control section 110 may further include a second processing section 117 which is capable of executing a second processing. If the control section 110 includes the second processing section 117, the process control section 115 may allow the second processing section to execute the second processing when the proximity volume determination section 118 determines that the first condition is met and the pressure value determination section 119 determines that the pressure value has not been changed. The second processing is not to be specifically limited, but in the above example, corresponds to the scrolling between pages.

The control section 110 may further include the drag detection section 113. The drag detection section 113 detects a drag that is an operation in which the operation tool 210 moves while contacting the contact surface 102a, as well as a distance and a direction that the operation tool 210 moves while contacting the contact surface 102a by the drag. The first processing section 116 executes a processing based on the distance and the direction which are detected by the drag detection section 113 as the first processing. The processing based on the distance and the direction which are detected by the drag detection section 113 is not to be specifically limited. The first processing section 116 may execute a processing of scrolling based on the distance and the direction which are detected by the drag detection section 113, for example, with respect to one page (PA20 in the example shown in FIG. 6) displayed in the display surface as the first processing.

The second processing section 117 detects a distance and a direction that the operation tool 210 moves while coming into proximity with the contact surface 102a, and executes a processing based on the distance and the direction which are detected as the second processing. The processing based on the distance and the direction which the second processing section 117 detected is not to be specifically limited. The second processing section 117 may execute a processing of scrolling between a plurality of pages displayed in the display surface based on the distance and the direction that are detected as the second processing.

The second processing section 117 may execute a processing of enlarging and reducing information displayed in the display surface based on the distance and the direction that are detected as the second processing. The second processing section 117 may execute a processing of speeding up and down a reproducing speed of a video image displayed in the display surface based on the distance and the direction that are detected as the second processing.

It may be possible to set a second threshold other than the first threshold. In that case, the proximity volume determination section 118 determines whether the proximity volume detected by the touch panel meets a second condition that is to be larger than a second threshold which is smaller than the first threshold before determining whether the first condition is met. When the proximity volume determination section 118 determines that the second condition is met, the process control section 115 determines whether the first condition is met, and when the proximity volume determination section 118 determines that the first condition is not met, the process control section 115 allows the second processing section to execute the second processing at a speed different from a case where the proximity volume determination section 118 determines that the first condition is met and the pressure value determination section 119 determines that the pressure value does not change. The level of speed for each of the different speeds is not to be specifically limited.

As for the second threshold, for example, threshold B (refer to FIG. 8) can be used. Note that a case where the proximity volume is larger than the second threshold which is smaller than the first threshold means a case where the operation tool 210 locates away from the contact surface 102a than the position where the proximity volume reaches the first threshold, and the operation tool 210 locates closer to the contact surface 102a than the position where the proximity volume reaches the second threshold. The second threshold is stored by, for example, the storage section 120.

The process control section 115 performs the scrolling between pages (refer to FIG. 8) at the speed of 2 pages per a unit of time, for example, when the proximity volume determination section 118 determines that the second condition is met and the proximity volume determination section 118 determines that the first condition is not met. The process control section 115 performs the scrolling between pages (refer to FIG. 8) at the speed of 5 pages per a unit of time, for example, when the proximity volume determination section 118 determines that the first condition is met and the pressure value determination section 119 determines that the pressure value has not been changed.

The process control section 115 may enlarge information to be displayed in the display surface at a double rate per a unit of time, for example, when the proximity volume determination section 118 determines that the second condition is met and the proximity volume determination section 118 determines that the first condition is not met. The process control section 115 may enlarge information to be displayed in the display surface at a five times rate per a unit of time, for example, when the proximity volume determination section 118 determines that the first condition is met and the pressure value determination section 119 determines that the pressure value has not been changed.

The process control section 115 may speed up a reproducing speed of a video image to be displayed in the display surface at a double speed per a unit of time, for example, when the proximity volume determination section 118 determines that the second condition is met and the proximity volume determination section 118 determines that the first condition is not met. The process control section 115 may speed up a reproducing speed of a vide image to be displayed in the display surface at a five times speed per a unit of time, for example, when the proximity volume determination section 118 determines that the first condition is met and the pressure value determination section 119 determines that the pressure value has not been changed.

The control section 110 may include a contact start detection section 111, a contact end detection section 114 or the like. The contact start detection section 111 detects that the operation tool 210 starts touching the contact surface 102*a*. The contact end detection section 114 detects that the operation tool 210 ends touching the contact surface 102*a*.

Figure 8:
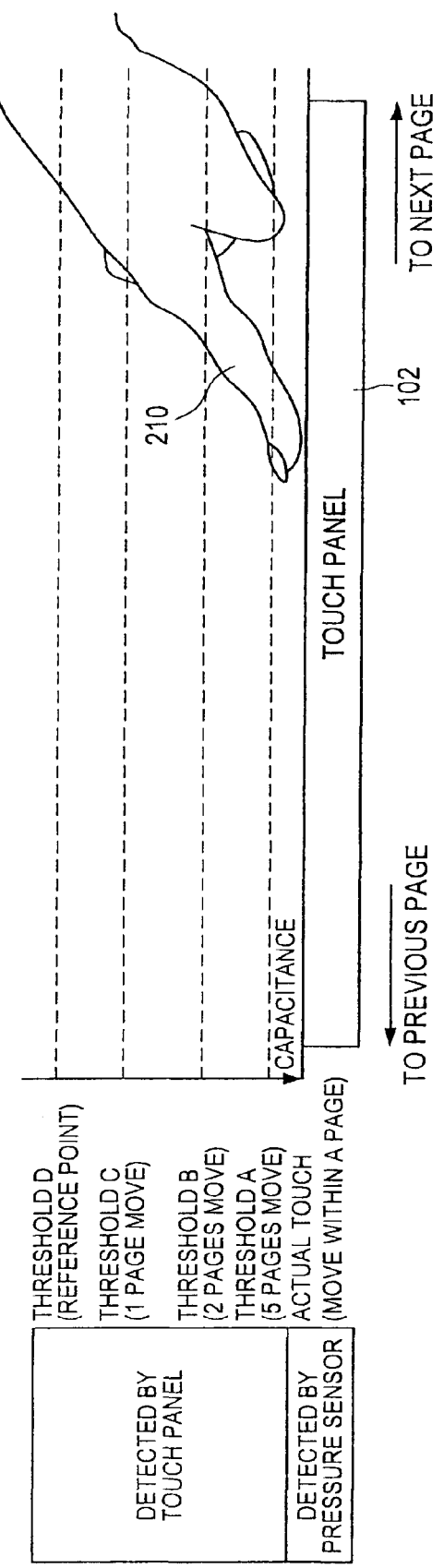
FIG. 8 is an explanatory view illustrating an example how capacitance and a pressure value which are detected by the information processing apparatus according to the first embodiment correspond to a processing to be executed.

1-8. A Correspondence between Capacitance or a Pressure Value which are Detected by an Information Processing Apparatus and a Processing To be Executed FIG. 8 is an explanatory view illustrating an example how capacitance and a pressure value which are detected by the information processing apparatus according to the first embodiment of the present invention correspond to a processing to be executed. The correspondence relationship between the capacitance and the pressure value which are detected by the information processing apparatus according to the first embodiment of the present invention, and the processing to be executed will be explained with reference to FIG. 8.

The control section 110 of the information processing apparatus 100 is capable of executing a book viewer, for example. The control section 110 is capable of displaying an image for one page on the display section 150. The control section 110 controls the image on each page by a series of page number when there are a plurality of pages. The image on each page and the series of page numbers can be stored in the storage section 120.

When the user performs a contact operation to the touch panel 102, the user can perform enlarging or reducing and screen scrolling within a page displayed in the display section 150. The user can perform the contact operation by a gesture operation with respect to the touch panel 102. Moreover, the user can perform scrolling between pages by a proximity operation, and the speed of the scrolling between pages is determined based on the distance between the touch panel 102 and the operation tool 210.

Specifically, the information processing apparatus 100 can increase an amount of page move per scroll in the scrolling between pages by the proximity operation at a position close to the touch panel 102. As shown in FIG. 8, for example, defining the threshold A, B, C, and D in the order of the closeness to the touch panel 102, the information processing apparatus 100 can assign 5 pages, 2 pages and 1 page for the amount of scrolling when the capacitance of the touch panel 102 exceeds each of the threshold A, B, and C. Note that the threshold D is a reference point and if the capacitance of the touch panel 102 exceeds the threshold D, it can be determined that the proximity operation has been done. The direction of the scrolling between pages can be defined arbitrarily, and at a position in proximity to the touch panel 102, for example, a scroll to the right direction can be defined to move to the next page. Also, a scroll to the left direction can be defined to move to the previous page.

1-9. A Flow of Operation in an Information Processing Apparatus (1)

Figure 9:
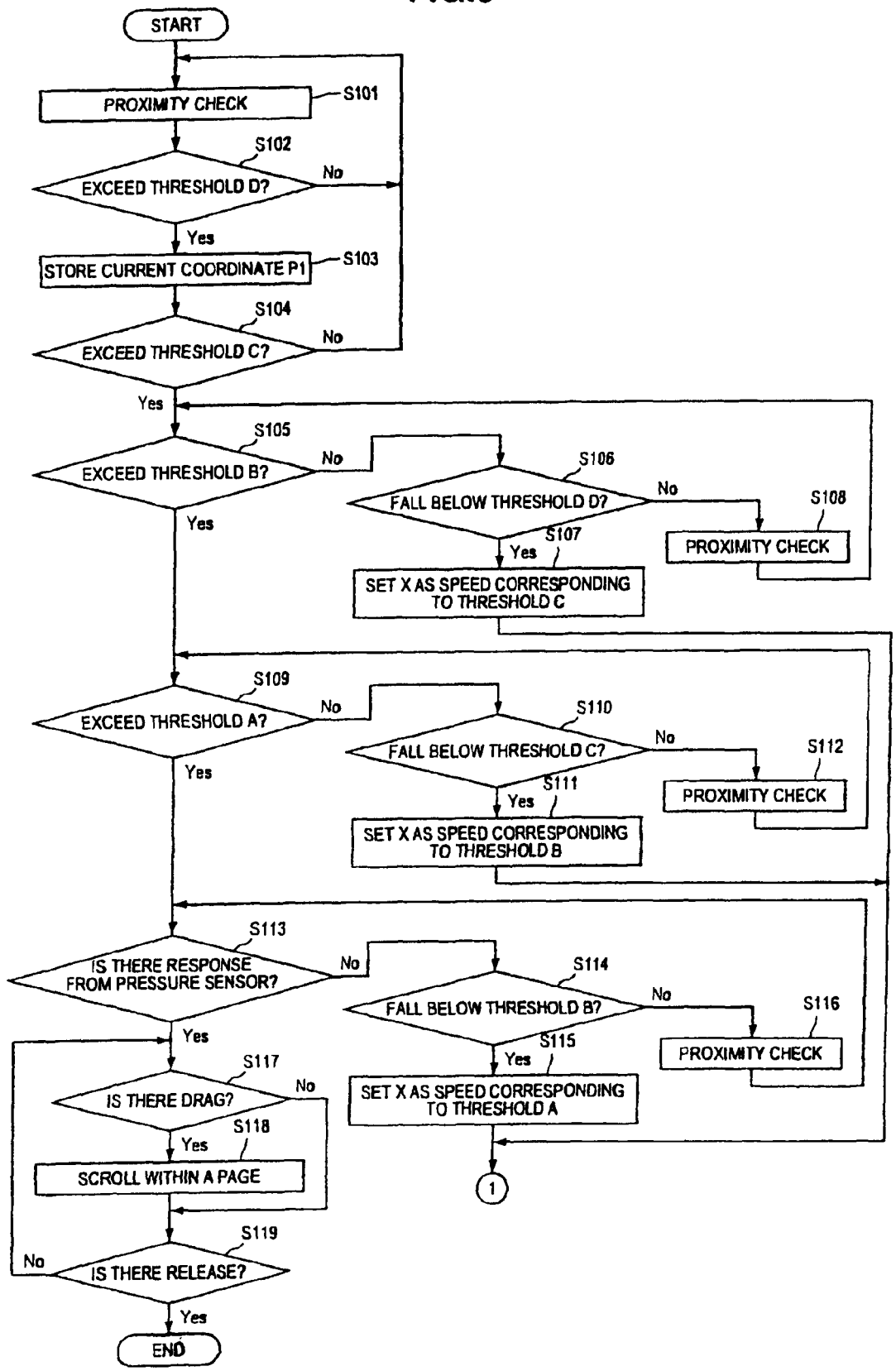
FIG. 9 is a flow chart 1 indicating a flow of operations in the information processing apparatus according to the first embodiment.

FIG. 9 is a flow chart 1 indicating a flow of operations in the information processing apparatus according to the first embodiment of the present invention. The flow of operations in the information processing apparatus 100 according to the first embodiment of the present invention will be explained with reference to FIG. 9.

The CPU 108 of the information processing apparatus 100 generates a thread continuing to monitor the change in capacitance of the touch panel 102 when the application starts, and checks whether the operation tool 210 such as a finger of the user has come into proximity to the touch panel 102 (step S101). The proximity volume determination section 118 checks whether the capacitance exceeds the threshold D (step S102). When the proximity volume determination section 118 determines that the capacitance exceeds the threshold D (Yes in step S102), the second processing section 117 stores coordinate P1 of the operation tool 210 on the touch panel 102 currently detected (step S103). The information processing apparatus 100 can detects the coordinate of the operation tool 210 even though the operation tool 210 is not in contact with the touch panel 102 when a capacitive touch panel or the like is used for its touch panel.

Next, the proximity volume determination section 118 checks whether the capacitance exceeds the threshold C (step S104). When the proximity volume determination section 118 determines that the capacitance exceeds the threshold C (Yes in step S104), it further checks whether it exceeds the threshold B (step S105). When determined that the capacitance does not exceed the threshold B (No in step S105), the proximity volume determination section 118 further monitors the capacitance and checks whether the capacitance falls below the threshold D (step S106).

When the proximity volume determination section 118 determines that the capacitance falls below the threshold D (Yes in step S106), the second processing section 117 sets the speed corresponding to the threshold C (here, one page for scrolling) to a variable X (step S107), and proceeds to step S120. When determined that the capacitance does not fall below the threshold D (No in step S106), the proximity volume determination section 118 checks whether the operation tool 210 came into proximity to the touch panel 102 (step S108), and returns to step S105.

When determined that the capacitance exceeds the threshold B (Yes in step S105), the proximity volume determination section 118 checks whether it further exceeds the threshold A (step S109). When determined that the capacitance does not exceeds the threshold A (No in step S109), the proximity volume determination section 118 checks whether the capacitance fell below the threshold C (step S110).

When the proximity volume determination section 118 determines that the capacitance falls below the threshold C (Yes in step S110), the second processing section 117 set the speed corresponding to the threshold B (here, 2 pages for scrolling) to a variable X (step S111), and proceeds to step S120. When determined that the capacitance does not fall below the threshold D (No in step S110), the proximity volume determination section 118 checks whether the operation tool 210 has come into proximity to the touch panel 102 (step S112), and returns to step S109.

When the proximity volume determination section 118 determines that the capacitance exceeds the threshold A (Yes in step S109), the pressure value determination section 119 checks whether the pressure sensor 105 responds (step S113). When the pressure value determination section 119 determines that the pressure sensor 105 does not respond (No in step S113), the proximity volume determination section 118 checks whether the capacitance falls below the threshold B (step S114). When the proximity volume determination section 118 determines that the capacitance falls below the threshold B (Yes in step S114), the second processing section 117 sets the speed corresponding to the threshold A (here, 5 pages for scrolling) to a variable X (step S115), and proceeds to step S120.

When the pressure value determination section 119 determines that the pressure sensor 105 does not respond (No in step S113), and the proximity volume determination section 118 determines that the capacitance does not fall below the threshold B (No in step S114), the proximity volume determination section 118 checks whether the operation tool 210 has come into proximity (step S116), and returns to step 113.

When pressure value determination section 119 determines that the pressure sensor 105 responds (Yes in step S113), the drag detection section 113 checks whether the operation tool 210 drags on the touch panel 102 (step S117). When the drag detection section 113 detects a drag (Yes in step S117), the first processing section 116 scrolls within a page in the direction of the dragging (step S118), and the contact end detection section 114 checks whether the operation tool 210 has released the touch panel 102 (step S119). When the contact end detection section 114 determines that the touch panel has been released (Yes in step S119), the control section 110 terminates the processing.

1-10. A Flow of Operation in an Information Processing Apparatus (2)

Figure 10:
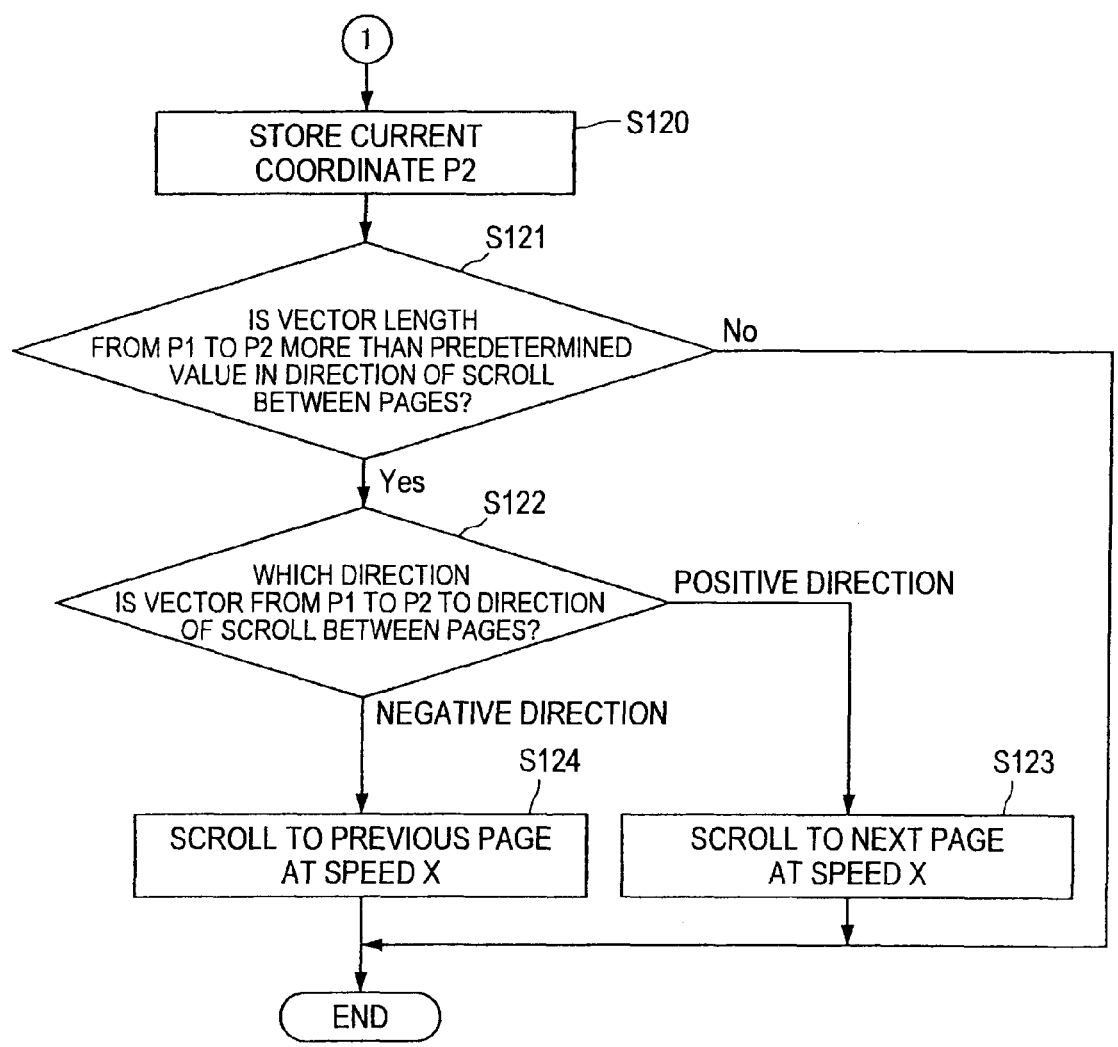
FIG. 10 is a flow chart 2 indicating a flow of operations in the information processing apparatus according to the first embodiment.

FIG. 10 is a flow chart 2 indicating a flow of operations in the information processing apparatus according to the first embodiment of the present invention. The flow of operations in the information processing apparatus according to the first embodiment of the present invention will be explained with reference to FIG. 10.

When proceeding to step S120, the second processing section 117 stores the current coordinate P2. (step S120). The second processing section 117 calculates length of two-dimensional vector from P1 to P2 in the direction parallel to the screen, and checks whether the vector length exceeds the predetermined value in the direction of the scrolling between pages (here, in the right direction or the left direction) (step S121). When determined that the vector length from P1 to P2 exceeds the predetermined value in the direction of the scrolling between pages (Yes in step S121), the second processing section 117 checks whether the direction of the vector is in the positive (right) direction or the negative (left) direction (step S122).

When determined that the direction of the vector is in the right direction (the positive direction in step S122), the second processing section 117 scrolls to the next page at the speed specified by the variable X (step S123), and terminates the processing. When determined that the direction of the vector is in the left direction (the negative direction in step S122), the second processing section 117 scrolls to the previous page at the speed specified by the variable X (step S124), and terminates the processing.

Among the proximity checks shown in FIG. 9 and FIG. 10, steps S108, S112, step S116 and the like are not mandatory, and to be performed as needed.

Figure 11:
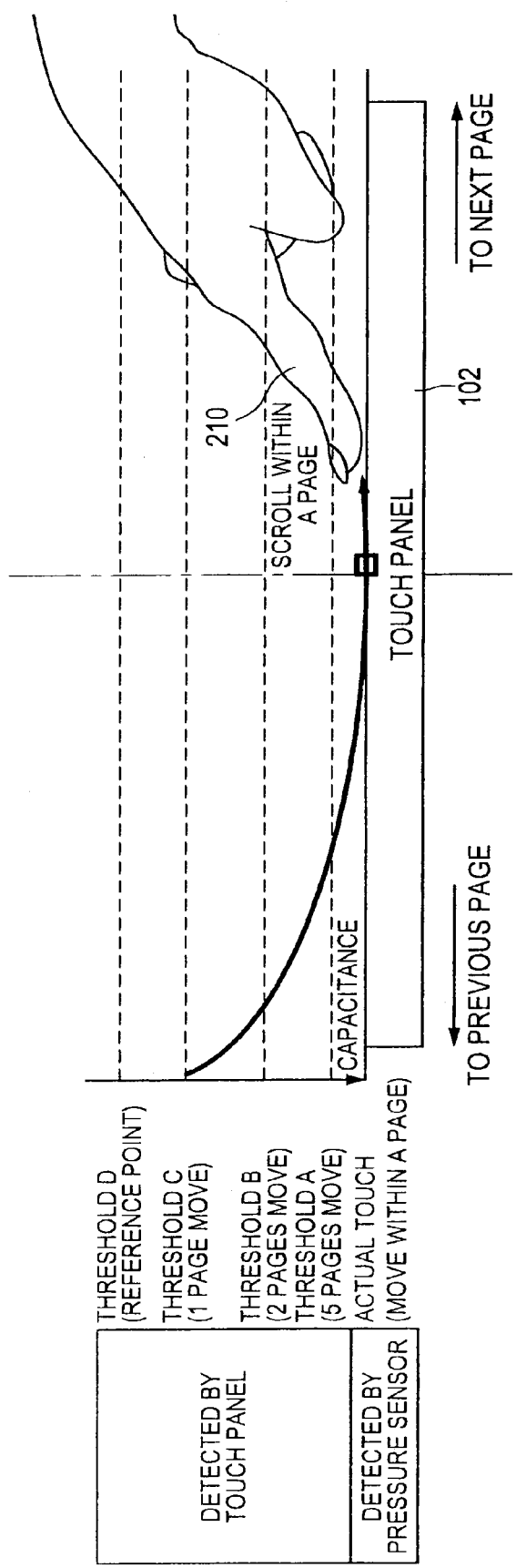
FIG. 11 is an explanatory view illustrating an operation when a pressure value is detected by the information processing apparatus according to the first embodiment.

1-11. An Operation When a Pressure Value is Detected by an Information Processing Apparatus FIG. 11 is an explanatory view illustrating an operation when a pressure value is detected by the information processing apparatus according to the first embodiment of the present invention. The operation when a pressure value is detected by the information processing apparatus according to the first embodiment of the present invention will be explained with reference to FIG. 11.

As shown in FIG. 11, when the operation tool 210 contacts the touch panel 102, the pressure sensor 105 detects a press to the touch panel 102 by the operation tool 210. When the pressure sensor 105 detects the press, the first processing section 116 performs the first processing. The first processing section 116 can, as a first processing, for example, scroll within a page to a page to be displayed in the display section 150.

Figure 12:
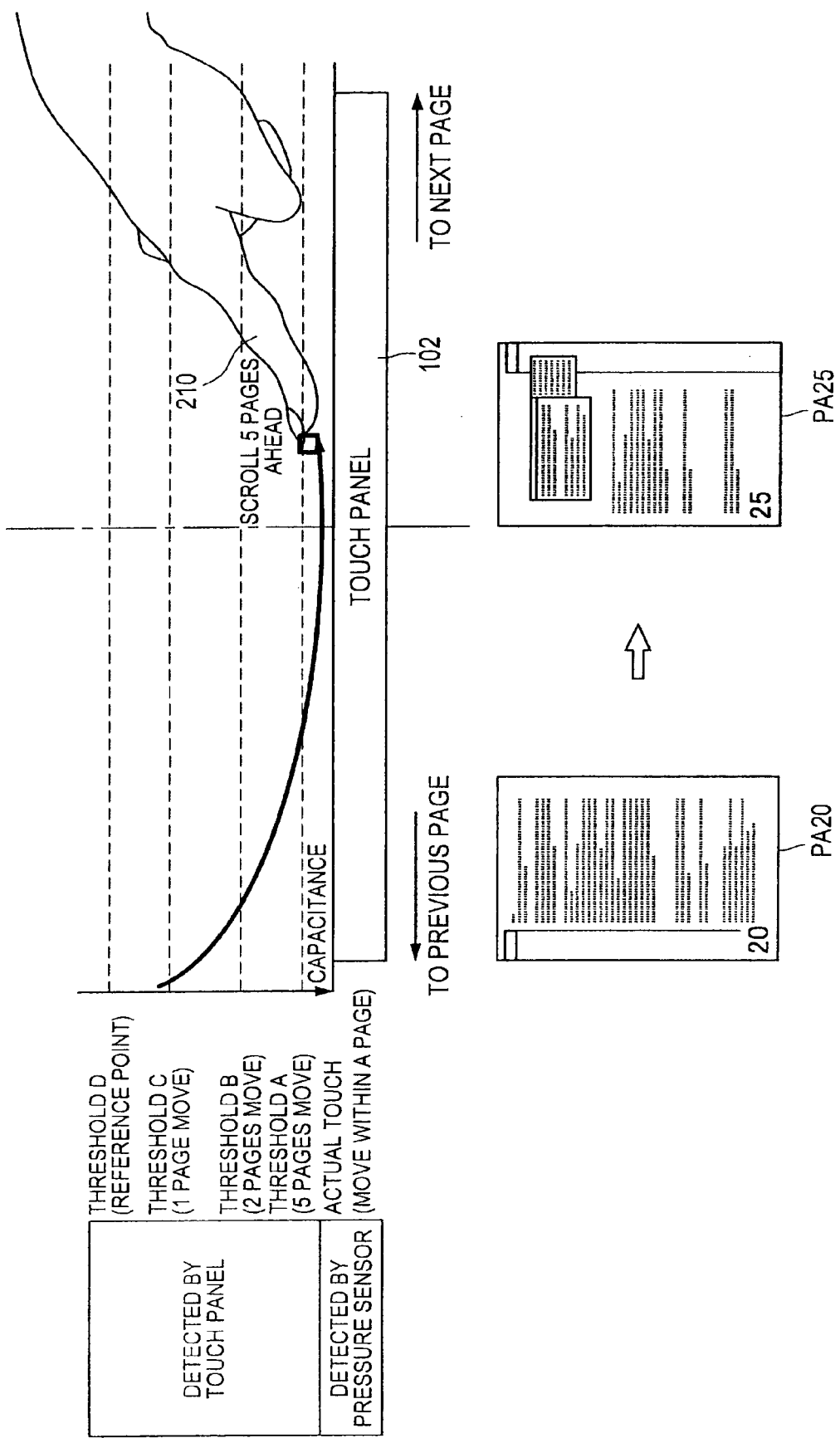
FIG. 12 is an explanatory view illustrating an operation when a relatively large capacitance is detected by the information processing apparatus according to the first embodiment.

1-12. An Operation When a Relatively Large Capacitance is Detected by an Information Processing Apparatus FIG. 12 is an explanatory view illustrating an operation when a relatively large capacitance is detected by the information processing apparatus according to the first embodiment of the present invention. The operation when a relatively large capacitance is detected by the information processing apparatus according to the first embodiment of the present invention will be explained with reference to FIG. 12.

As shown in FIG. 12, when the operation tool 210 comes into proximity to the touch panel 102 at a position where the capacitance exceeds the threshold A, the proximity volume determination section 118 detects that the capacitance exceeds the threshold A. Moreover, since the operation tool 210 does not touch the touch panel 102, the pressure sensor 105 does not detect a press to the touch panel 102 by the operation tool 210. Unless the pressure sensor 105 detects the press, the first processing section 116 does not execute the first processing.

Instead, since proximity is detected by the proximity volume determination section 118, the second processing section 117 executes the second processing. The second processing section 117 can, as a second processing, for example, scroll between pages to a plurality of pages to be displayed in the display section 150. Specifically, as shown in FIG. 12, when the proximity volume determination section 118 determines that the capacitance exceeds the threshold A, the second processing section 117 executes a processing of scrolling (to 5 pages ahead) at a speed corresponding to the threshold A as a second processing.

Figure 13:
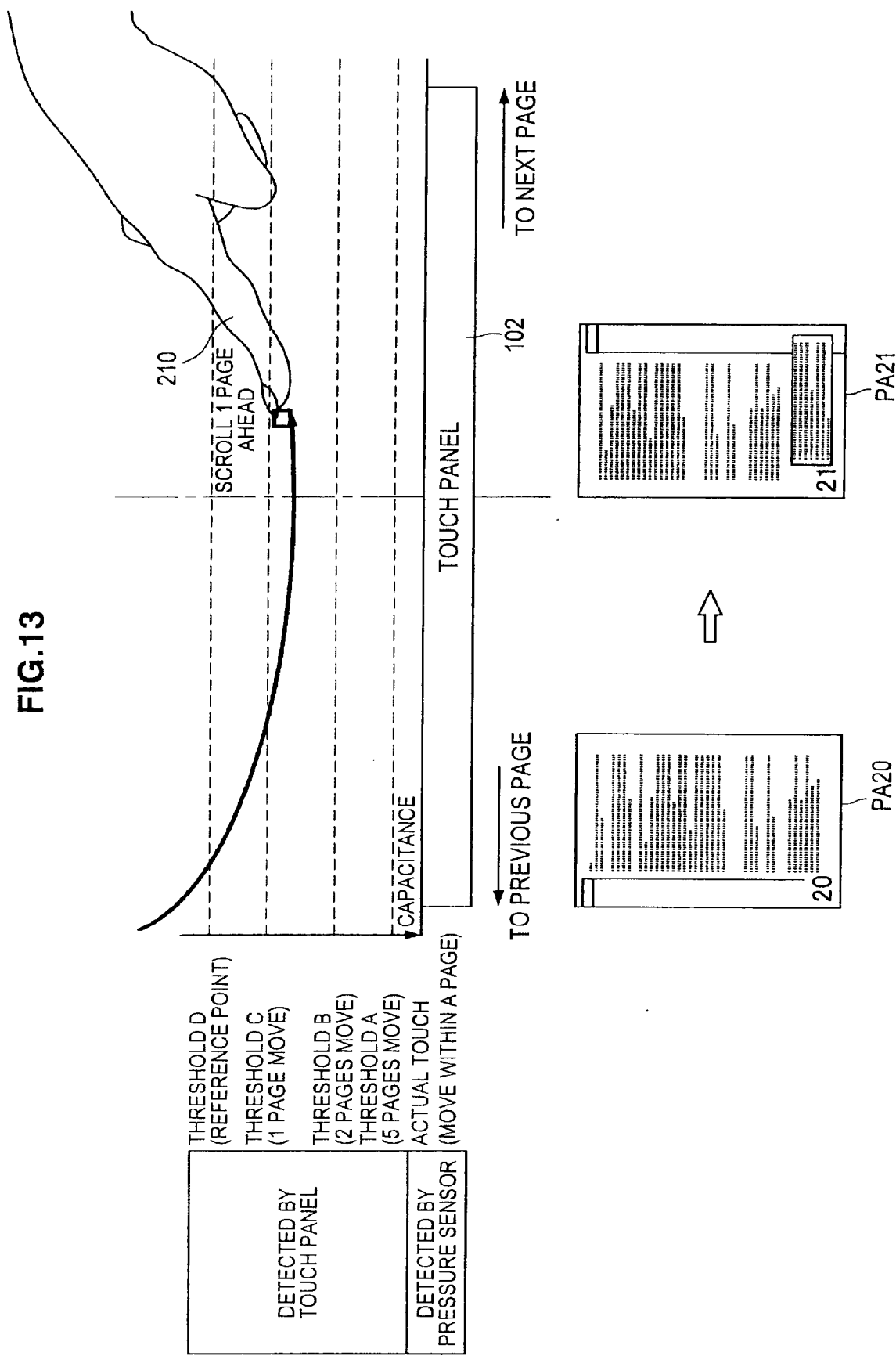
FIG. 13 is an explanatory view illustrating an operation when a relatively small capacitance is detected by the information processing apparatus according to the first embodiment.

1-13. An Operation When a Relatively Small Capacitance is Detected by an Information Processing Apparatus FIG. 13 is an explanatory view illustrating an operation when a relatively small capacitance is detected by the information processing apparatus according to the first embodiment of the present invention. The operation when a relatively small capacitance is detected by the information processing apparatus according to the first embodiment of the present invention will be explained with reference to FIG. 13.

As shown in FIG. 13, when the operation tool 210 comes into proximity to the touch panel 102 at a position where the capacitance exceeds the threshold C, the proximity volume determination section 118 detects that the capacitance exceeds the threshold C. Moreover, since the operation tool 210 does not touch the touch panel 102, the pressure sensor 105 does not detect a press to the touch panel 102 by the operation tool 210. Unless the pressure sensor 105 detects the press, the first processing section 116 does not execute the first processing.

Instead, since proximity is detected by the proximity volume determination section 118, the second processing section 117 executes the second processing. The second processing section 117 can, as a second processing, for example, scroll between pages to a plurality of pages to be displayed in the display section 150. Specifically, as shown in FIG. 13, when the proximity volume determination section 118 determines that the capacitance exceeds the threshold C but does not exceed the threshold B, the second processing section 117 executes a processing of scrolling (to one page ahead) at a speed corresponding to the threshold C as a second processing.

2. Modification of the First Embodiment of the Present Invention

It should be understood by those skilled in the art that various modifications, combinations, sub-combinations and alterations may occur depending on design requirements and other factors insofar as they are within the scope of the appended claims or the equivalents thereof.

For example, the above embodiment has been described a case where the speed of scrolling between pages is more increased when the operation tool 210 locates closer to the touch panel 102 comparing to a case where the operation tool 210 locates in distance from the touch panel 102. However, the present invention is not limited to this example. For example, the speed of scrolling between pages may be more decreased when the operation tool 210 locates closer to the touch panel 102 comparing to a case where the operation tool 210 locates in distance from the touch panel 102.

In the above embodiment, an example has been mainly explained where scrolling between pages are performed by the proximity operation of the operation tool 210, however, the present invention is not limited to this example. For example, enlarging the content displayed on the display section 150 may be performed. In that case, it is also possible that the proximity operation by the operation tool 210 enlarges the content displayed on the display section 150, and the contact operation by the operation tool 210 selects a part of content displayed on the display section 150.

3. Summary

According to the present embodiment, it becomes possible to clearly distinguish between a proximity operation and a contact operation based on a fine touch response appeared in the pressure sensor when an operation tool contacts a touch panel in an information processing apparatus capable of detecting proximity to the touch panel by the operation tool. Then it becomes possible to perform a proximity operation by the operation tool at a position close to the touch panel.

Since this decreases the possibility of recognizing a proximity operation wrongly as a contact operation, it becomes possible to set a detecting range wide with respect to the proximity operation. Moreover, this brings an effect that it becomes easy to change a processing subject to be executed in accordance with the distance of the operation tool from the touch panel.

The present application contains subject matter related to that disclosed in Japanese Priority Patent Application JP 2009-202956 filed in the Japan Patent Office on Sep. 2, 2009, the entire content of which is hereby incorporated by reference.

What is claimed is:

1. An information processing apparatus comprising:
a display section that has a display surface and is capable of displaying information on the display surface;
a touch panel that has a contact surface and is capable of detecting a degree of proximity between the contact surface and an operation tool as a proximity volume;
a pressure value detection section that detects a pressure value which is a size of a pressure applied to the contact surface by the operation tool;
a pressure value monitor section that monitors the pressure value detected by the pressure value detection section in conjunction with an elapsed time;
a proximity volume determination section that determines whether the proximity volume detected by the touch panel meets a first condition which is to be larger than a first threshold;
a pressure value determination section that determines whether the pressure value monitored by the pressure value monitor section has changed;
a first processing section capable of executing a first processing;
a process control section that allows the first processing section to execute the first processing when the first condition is determined to be met by the proximity volume determination section and the pressure value is determined to be changed by the pressure value determination section, and that does not allow the first processing section to execute the first processing when the first condition is determined to be met by the proximity volume determination section and the pressure value is determined not to be changed by the pressure value determination section; and
a second processing section capable of executing a second processing,
wherein the process control section allows the second processing section to execute the second processing when the first condition is determined to be met by the proximity volume determination section and the pressure value is determined not to be changed by the pressure value determination section,
wherein the first processing is one of an enlargement or reduction of a single page being displayed on the display surface and a screen scrolling within the single page displayed on the display surface, the first processing being performed in accordance with a touch gesture operation performed upon the display surface, and
wherein the second processing is a scrolling between different pages for display on the display surface, the second processing being performed in accordance with a proximity gesture operation performed in proximity to but not touching the display surface, and a speed of the scrolling being set based on the detected proximity volume.

2. The information processing apparatus according to claim 1, wherein the touch panel detects capacitance on the contact surface as the proximity volume, wherein the capacitance increases as the operation tool comes into proximity with the contact surface.

3. The information processing apparatus according to claim 1, further comprising a drag detection section that detects a drag that is an operation in which the operation tool moves while contacting the contact surface, as well as a distance and a direction that the operation tool moves while contacting the contact surface by the drag,
wherein the first processing section executes a processing based on the distance and the direction which are detected by the drag detection section as the first processing.

4. The information processing apparatus according to claim 3,
wherein the first processing section executes a processing of scrolling within one page displayed in the display surface based on the distance and the direction which are detected by the drag detection section as the first processing.

5. The information processing apparatus according to claim 1,
wherein the second processing section detects a distance and a direction that the operation tool moves while coming into proximity with the contact surface, and executes a processing based on the distance and the direction that are detected as the second processing.

6. The information processing apparatus according to claim 5,
wherein the second processing section executes a processing of scrolling between a plurality of pages displayed in the display surface based on the distance and the direction that are detected as the second processing.

7. The information processing apparatus according to claim 5,
wherein the second processing section executes a processing of enlarging and reducing information displayed in the display surface based on the distance and the direction that are detected as the second processing.

8. The information processing apparatus according to claim 5,
wherein the second processing section executes a processing of speeding up and down a reproducing speed of a video image displayed in the display surface based on the distance and the direction that are detected as the second processing.

9. The information processing apparatus according to claim 1,
wherein the proximity volume determination section determines whether the proximity volume detected by the touch panel meets a second condition that is to be larger than a second threshold which is smaller than the first threshold before determining whether the first condition is met,
wherein, when the second condition is met by the proximity volume determination section, the process control section determines whether the first condition is met, and when the first condition is determined not to be met by the proximity volume determination section, the process control section allows the second processing section to execute the second processing at a speed different from a case where the first condition is determined to be met by the proximity volume determination section and the pressure value is determined not to be changed by the pressure value determination section.

10. The information processing apparatus according to claim 1, wherein
the pressure value detection section comprises a pressure sensitive sensor configured to directly sense pressure.

11. The information processing apparatus according to claim 10, wherein
the pressure sensitive sensor directly senses the pressure without consideration of the detected proximity volume.

12. The information processing apparatus according to claim 1, wherein
the pressure value detection section detects the pressure value without consideration of the detected proximity volume.

13. An information processing method comprising the steps of:
determining whether a proximity volume detected by a touch panel meets a first condition that is to be larger than a first threshold, by a proximity volume determination section of an information processing apparatus including a display section that has a display surface and is capable of displaying information on the display surface, a touch panel that has a contact surface and is capable of detecting a degree of proximity between the contact surface and an operation tool as the proximity volume, a pressure value detection section that detects a pressure value which is a size of a pressure applied to the contact surface by the operation tool, a pressure value monitor section that monitors the pressure value detected by the pressure value detection section in conjunction with an elapsed time, a proximity volume determination section, a pressure value determination section, a first processing section capable of executing a first processing, and a process control section;
determining, by the pressure value determination section, whether the pressure value monitored by the pressure value monitor section has changed;
allowing, by the process control section, the first processing section to execute the first processing when the first condition is determined to be met by the proximity volume determination section and the pressure value is determined to be changed by the pressure value determination section, and not allowing the first processing section to execute the first processing when the first condition is determined to be met by the proximity volume determination section and the pressure value is determined not to be changed by the pressure value determination section; and
allowing, by the process control section, a second processing section to execute a second processing when the first condition is determined to be met by the proximity volume determination section and the pressure value is determined not to be changed by the pressure value determination section,
wherein the first processing is one of an enlargement or reduction of a single page being displayed on the display surface and a screen scrolling within the single page displayed on the display surface, the first processing being performed in accordance with a touch gesture operation performed upon the display surface, and
wherein the second processing is a scrolling between different pages for display on the display surface, the second processing being performed in accordance with a proximity gesture operation performed in proximity to but not touching the display surface, and a speed of the scrolling being set based on the detected proximity volume.

14. The method of claim 13 further comprising:
detecting a drag that is in an operation in which the operation tool moves while contacting the contact surface, as well a distance and a direction that the operation tool moves while contacting the contact surface by the drag; and
executing, by the first processing section, a processing based on the detected distance and the direction as the first processing.

15. The method of claim 14, wherein first processing comprises:
executing a processing of scrolling within one page displayed in the display surface based on the distance and the direction which are detected by the drag detection section as the first processing.

16. The method of claim 13 further comprising:
detecting a distance and a direction that the operation tool moves while coming into proximity with the contact surface; and
executing, by the second processing section, a processing based on the detected distance and the direction as the second processing.

17. The method of claim 16, wherein the second processing comprises:
executing a processing of scrolling between a plurality of pages displayed in the display surface based on the distance and the direction that are detected as the second processing.

18. The method of claim 16, wherein the second processing comprises:

executing a processing of enlarging and reducing information displayed in the display surface based on the distance and the direction that are detected as the second processing.

19. The method of claim 16, wherein the second processing comprises:

executing a processing of speeding up and down a reproducing speed of a video image displayed in the display surface based on the distance and the direction that are detected as the second processing.

20. A non-transitory computer readable medium storing a program causing a computer to function as an information processing apparatus including:

a display section that has a display surface and is capable of displaying information on the display surface;

a touch panel that has a contact surface and is capable of detecting a degree of proximity between the contact surface and an operation tool as a proximity volume;

a pressure value detection section that detects a pressure value which is a size of a pressure applied to the contact surface by the operation tool;

a pressure value monitor section that monitors the pressure value detected by the pressure value detection section in conjunction with an elapsed time;

a proximity volume determination section that determines whether the proximity volume detected by the touch panel meets a first condition which is to be larger than a first threshold;

a pressure value determination section that determines whether the pressure value monitored by the pressure value monitor section has changed;

a first processing section capable of executing a first processing;

a process control section that allows the first processing section to execute the first processing when the first condition is determined to be met by the proximity volume determination section and the pressure value is determined to be changed by the pressure value determination section, and that does not allow the first processing section to execute the first processing when the first condition is determined to be met by the proximity volume determination section and the pressure value is determined not to be changed by the pressure value determination section; and a second processing section capable of executing a second processing, wherein the process control section allows the second processing section to execute the second processing when the first condition is determined to be met by the proximity volume determination section and the pressure value is determined not to be changed by the pressure value determination section, wherein the first processing is one of an enlargement or reduction of a single page being displayed on the display surface and a screen scrolling within the single page displayed on the display surface, the first processing being performed in accordance with a touch gesture operation performed upon the display surface, and wherein the second processing is a scrolling between different pages for display on the display surface, the second processing being performed in accordance with a proximity gesture operation performed in proximity to but not touching the display surface, and a speed of the scrolling being set based on the detected proximity volume.

\* \* \* \* \*